United States Patent [19]

Hayes

[11] Patent Number: 4,852,513
[45] Date of Patent: Aug. 1, 1989

[54] POWDER RECOVERY SYSTEM

[75] Inventor: Stanley K. Hayes, Indianapolis, Ind.

[73] Assignee: Ransburg Corporation, Indianapolis, Ind.

[21] Appl. No.: 173,256

[22] Filed: Mar. 25, 1988

[51] Int. Cl.$^4$ ............................................. B05B 15/12
[52] U.S. Cl. ............................... 118/326; 118/DIG. 7
[58] Field of Search ................. 118/634, 326, DIG. 7; 98/115.2

[56] References Cited

U.S. PATENT DOCUMENTS

| | | |
|---|---|---|
| 3,870,016 | 3/1975 | Schneider ........................ 118/326 X |
| 3,902,455 | 9/1975 | Lehmann et al. ..................... 118/630 |
| 3,918,641 | 11/1975 | Lehmann et al. ..................... 239/15 |
| 4,094,654 | 6/1978 | Prinzing . |

FOREIGN PATENT DOCUMENTS

| | | | |
|---|---|---|---|
| 2134775 | 8/1972 | Fed. Rep. of Germany ...... 118/634 |
| 87/8700771 | 2/1987 | PCT Int'l Appl. ................. 98/115.2 |

Primary Examiner—Shrive Beck
Attorney, Agent, or Firm—Barnes & Thornburg

[57] ABSTRACT

An apparatus for recovering a grannular material which is dispensed onto articles to be coated by the grannular material in an enclosure but not all of which grannular material adheres to the articles. The apparatus includes a belt of a material which is essentially impermeable to the grannular material, and a pair of rolls about which the belt is trained. The rolls extend generally horizontally and generally parallel to each other. The belt has a vertically upper, generally horizontal run and a vertically lower, generally horizontal run. The vertically upper run of the belt is exposed to the interior of the enclosure. The non-adherent material is deposited onto the upper run. A hopper for recovering the non-adherent material deposited on the upper run is provided adjacent and vertically below the rolls. A prime mover is coupled to the rolls to cause non-adherent grannular material to be conveyed to the hopper.

2 Claims, 3 Drawing Sheets

POWDER RECOVERY SYSTEM

This invention relates to apparatus for the recovery of grannular coating material, which will hereinafter generally be called powder. Such powder typically is sprayed onto articles as the articles are conveyed through a booth. Some of the powder adheres to the articles owing to an electrostatic charge which is induced on the powder as it is dispensed, or to fusion of the powder to the surfaces of the articles, which surfaces may have been preheated to promote such fusion, or both. Some of the powder particles do not adhere, and accumulate instead on the floor and other surfaces of the booth.

Numerous techniques for the recovery and re-use of these typically fairly expensive powders are known. There are, for example, the systems illustrated and described in U.S. Pat. Nos.: 3,902,455; 3,918,641; and, 4,094,654. These systems rely generally on a moving air-permeable cloth or "rug", or a drum covered with an air-permeable cloth in the process of recovery of the non-adherent powder. The non-adherent powder is conveyed to the air permeable cloth, typically either by gravity or by some combination of gravity and ambient air movement. The powder lodges in the surface of the cloth. The cloth moves under a powder recovery nozzle which applies suction to the surface, drawing air through the cloth and past the cloth surface. The powder is sucked into the nozzle with the air moving into the nozzle. This moving air is subjected to centrifugation or other separating technique to recover the powder from it. This recovered powder may then be reclaimed or recirculated, depending upon its condition when it is recovered.

According to the invention, an apparatus is provided for recovering a grannular material which is dispensed onto articles to be coated by the grannular material in an enclosure. Not all of the grannular material adheres to the articles. The apparatus includes a continuous belt of a material which is essentially impermeable to the grannular material, and a pair of rolls about which the belt is trained. The rolls extend generally horizontally and generally parallel to each other. The belt is trained about the rolls and has a vertically upper, generally horizontal run. Means are provided for rotatably mounting the rolls so that the vertically upper, generally horizontal run of the belt is exposed to the interior of the enclosure. At least some of the non-adherent material is deposited onto the upper run. Means are provided for defining adjacent, and vertically below, one of the rolls a hopper for recovering the non-adherent material deposited on the upper run. A prime mover and means for coupling the prime mover to at least one of the rolls are provided. Operation of the prime mover causes the vertically upper, generally horizontal run of the belt to convey non adherent grannular material to the hopper.

Illustratively the apparatus further comprises a blade, and means for mounting the blade to project into closely spaced orientation to the belt adjacent the hopper to remove from the belt any grannular material which tends to adhere to the belt and to deposit such grannular material into the hopper.

Further, illustratively, the apparatus comprises a conveyor for conveying articles to be coated through the enclosure. The enclosure has an upstream end into which articles to be coated enter the enclosure on the conveyor and a downstream end from which grannular material coated articles exit the enclosure on the conveyor.

Additionally according to an illustrative embodiment, the belt comprises a first belt, the pair of rolls comprises a first pair of rolls, the means for rotatably mounting the rolls comprises means for rotatably mounting one or the first pair of the rolls adjacent the upstream end of the enclosure and means for rotatably mounting the other roll of the first pair intermediate the upstream and downstream ends of the enclosure and adjacent the hopper, and the blade comprises a first blade. The apparatus further comprises a second continuous belt of a material which is essentially impermeable to the grannular material, and a second pair of rolls about which the second belt is trained. The rolls of the second pair extend generally horizontally and generally parallel to each other. The second belt is trained about the rolls of the second pair and has a vertically upper, generally horizontal run and a vertically lower, generally horizontal run. Means are provided for rotatably mounting the rolls of the second pair so that the vertically upper, generally horizontal run of the second belt is exposed to the interior of the enclosure. Some of the non-adherent material is deposited onto the upper run of the second belt. The means for rotatably mounting the rolls of the second pair comprises means for rotatably mounting one of the rolls of the second pair adjacent the downstream end of the enclosure and means for rotatably mounting the other roll of the second pair intermediate the upstream and downstream ends of the enclosure and adjacent the hopper. Means are provided for coupling at least one of the rolls of the second pair of rolls to the prime mover. Operation of the prime mover causes the vertically upper run of the second belt to convey non adherent grannular material to the hopper.

Additionally, illustratively, the apparatus further comprises a second blade, and means for mounting the second blade to project into closely spaced orientation to the second belt adjacent the hopper to remove from the second belt any grannular material which tends to adhere to the second belt and to deposit such grannular material into the hopper.

The invention may best be understood by referring to the following description and accompanying drawings. In the drawings:

FIGS. 1a–d illustrate schematic side elevational views of another prior art powder recovery apparatus;

Figure 1A:
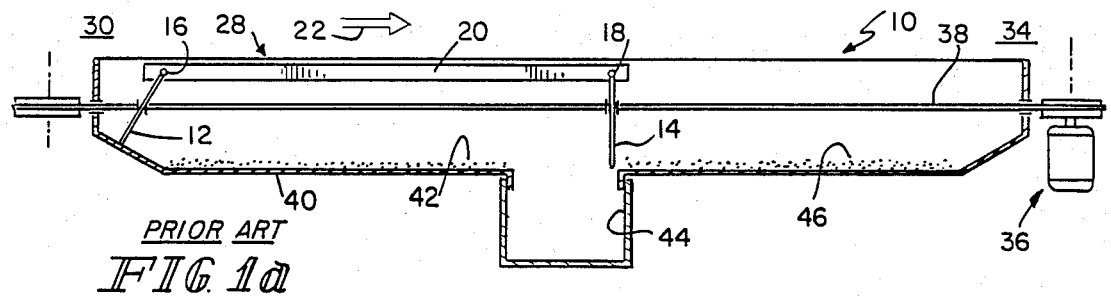
Figure 1B:
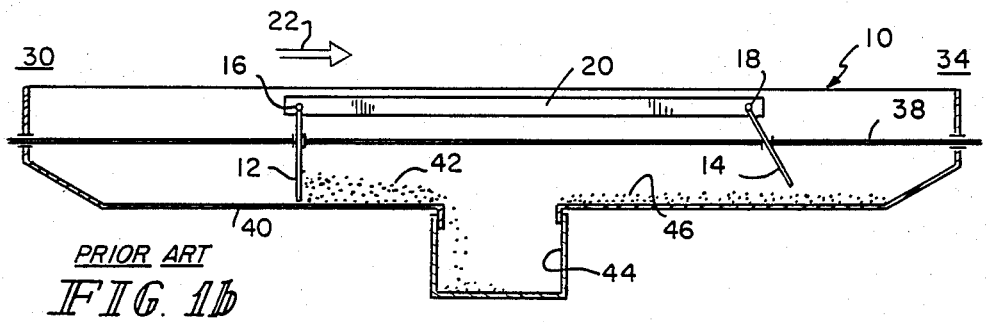
Figure 1C:
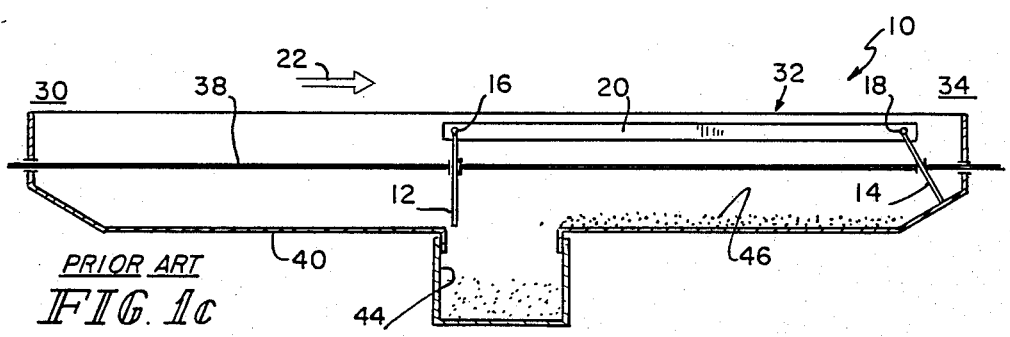
Figure 1D:
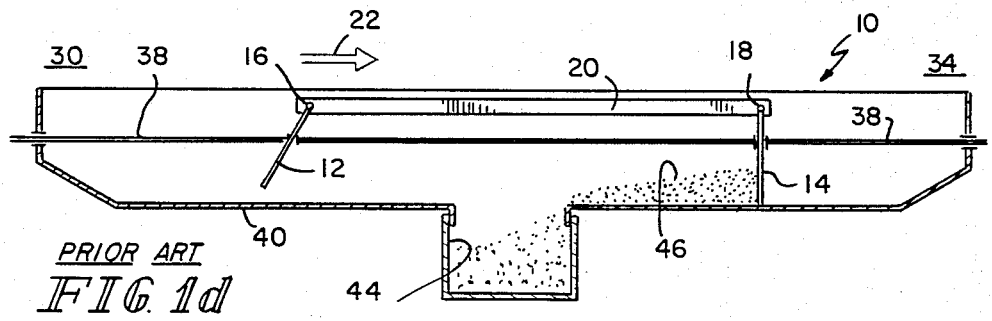

Turning now to FIGS. 1a–d, another prior art powder recovery system 10 includes two doctor blades 12, 14 pivotally mounted at 16, 18, respectively, from a carriage 20. Blades 12, 14 extend transversely of the direction 22 of motion of articles along a conveyor (not shown) through the powder coating booth to which system 10 is fitted. Carriage 20 is mounted in the booth for reciprocation between a position 28 adjacent the entry end 30 of the booth and a position 32 adjacent the exit end 34 of the booth. This reciprocation is achieved by a prime mover 36 (illustrated only in FIG. 1a) acting through control cable 38 on the doctor blades 12, 14, and thus on the carriage 20. As a powder coating operation is conducted, non-adherent powder accumulates on the floor 40 of the booth. At intervals which may be determined by some timing mechanism or by level sensors, neither of which is illustrated, in the booth, the prime mover 36 reciprocates carriage 20 and blades 12, 14. Cable 38 pivots blade 12 downward (FIG. 1b) so that it lightly engages floor 40. Blade 14 is pivoted upward out of engagement with floor 40 so that accumulated powder passes undisturbed under blade 14. Carriage 20 moves from entry end 30 toward exit end 34, scraping non-adherent powder 42 into a powder recovery hopper 44 provided at the longitudinal center of floor 40. Hopper 44 extends the full width of floor 40 and recovers all of the powder 42 scraped into it by blade 12. As blade 14 reaches the exit end 34 of the booth (FIG. 1c), prime mover 36 reverses, pivoting blade 12 upward out of engagement with floor 40 so that accumulated powder passes undisturbed under blade 12. Blade 14 is pivoted downward by this same action of the prime mover 36 to engage floor 40 lightly. Carriage 20 moves from exit end 34 toward entry end 30 (FIG. 1d), scraping non-adherent powder 46 into powder recovery hopper 44. This cycle is repeated at intervals.

Although this system performs its function quite admirably, some problems exist. First, the presence of the cabling 38 which connects the prime mover 36 to the doctor blades 12, 14 and carriage 20 is subject to the usual problems associated with cable-linked mechanical systems; stretching of the cable, fouling of the cable, breakage of the cable, and so on. Additionally, it is common for a workman to have to enter the booth from time to time to remove accumulated powder from walls and other surfaces not cleaned by blades 12, 14, such as during color changes when dispensing of a powder of one color is halted and dispensing of a powder of another color is begun. The workman has to step around among the various cables, blades and other pieces of equipment on the floor 40 of the booth during this process. This is unhandy, a safety hazard to the workman assigned to clean the equipment, and a potential source of damage to the equipment itself.

It is an object of the present invention to reduce these hazards and problems associated with this particular prior art powder recovery equipment.

Figure 2:
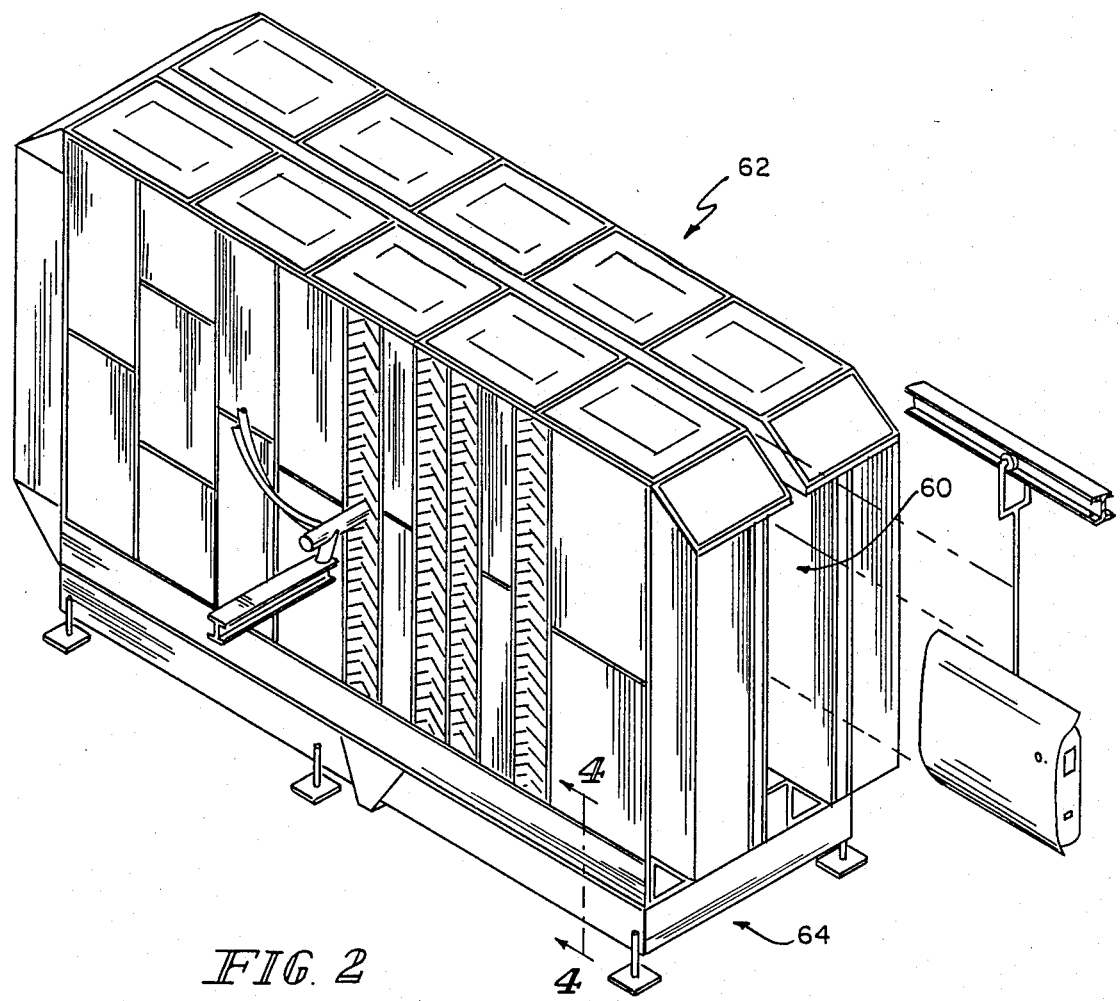
FIG. 2 illustrates a perspective view of a powder coating booth incorporating the powder recovery system of the present invention.
Figure 4:
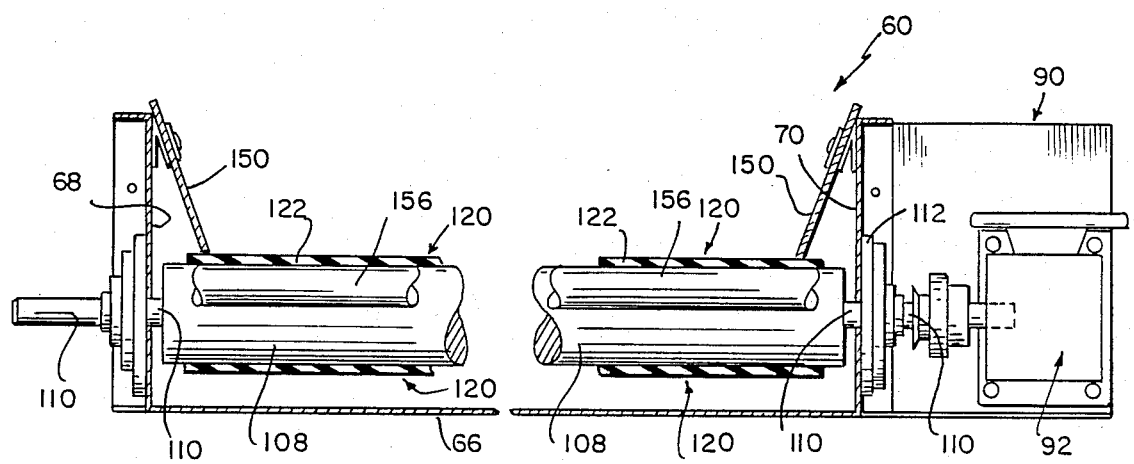
FIG. 4 illustrates a fragmentary sectional view of the details of FIG. 3 taken generally along section lines 4—4 thereof.
Figure 3:
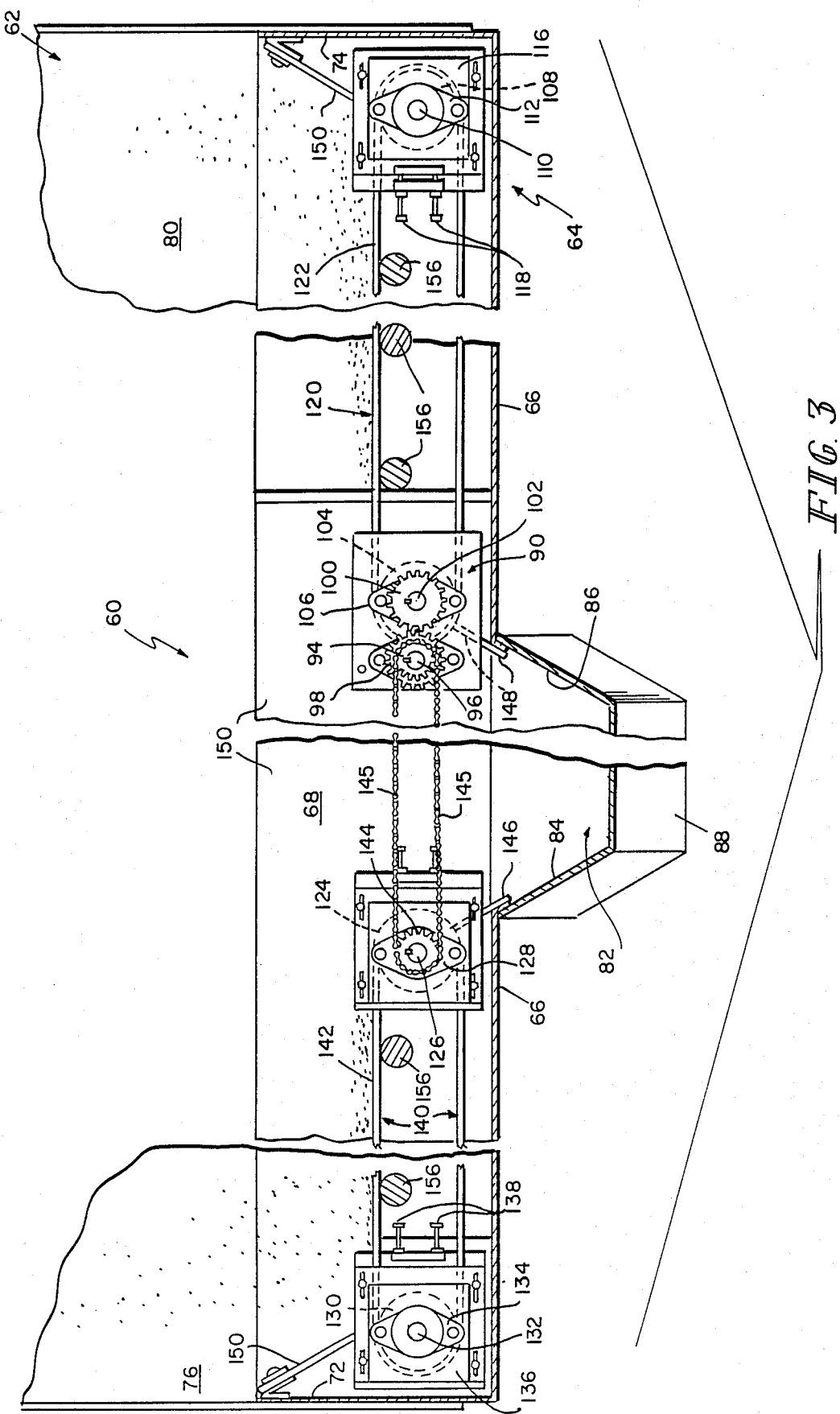
FIG. 3 illustrates a fragmentary sectional side elevation of certain details of the apparatus of FIG. 2 illustrating the invention.

Referring now to FIGS. 2-4, a powder recovery system 60 is provided for a powder coating booth 62. The recovery system 60 can be incorporated into a new booth as it is being constructed, or can be retrofitted to an existing booth in which the recovery system will occupy the bottom one to two feet of the booth's overall height. The powder recovery system 60 includes a generally somewhat pan- or cookie sheet-shaped floor portion 64 having a floor 66 and upstanding side- and end walls 68, 70; 72, 74, respectively, joined, for example, by welding, at their corners. The booth 62 side- and end walls can be mounted directly to side- and end walls 68, 70; 72, 74, as illustrated in FIG. 3.

A powder collection hopper 82 is positioned substantially halfway along the length of floor 66 between entry end 76 and exit end 80 and includes sidewalls 84, 86 which slope toward each other, and a floor 88 which slopes downward from sidewall 70 toward sidewall 68. A powder transfer pump, not shown, is mounted at the low point of hopper 82 along sidewall 68 to transfer powder from hopper 82 to a reclaim facility.

A transmission housing 90 extends outside of sidewall 70 along the length of floor portion 64. Housing 90 houses a prime mover 92 which illustratively is a fractional horsepower electric motor and gear reduction mechanism. A chain drive sprocket 94 is keyed to the output shaft 96 of prime mover 92. A drive gear 98 is also keyed to output shaft 96. The drive gear 98 engages a driven gear 100 on the shaft 102 of a roll 104. Shaft 102 extends through bearings 106 mounted in sidewall 70 and sidewall 68, and roll 104 lies within floor portion 64. Another roll 108 is mounted by its shaft 110 from bearings 112 mounted at the exit end 80 of booth 62 on plates 116 adjustable longitudinally of booth 62 by turning of bolts 118 to increase or decrease the tension on a solid, powder-impermeable rubber belt 120 trained about rolls 104, 108. This drive mechanism causes the top run 122 of belt 120 to move toward hopper 82.

A similar mechanism at the entry end 76 of floor portion 64 includes a roll 124 on a shaft 126 journalled in bearings 128 and a roll 130 on a shaft 132 journalled in bearings 134 mounted on longitudinally adjustable plates 136. Plates 136 are adjustable by turning bolts 138 to increase or decrease the tension on a solid, powder-impermeable rubber belt 140 trained about rolls 124, 130. This drive mechanism causes the top run 142 of belt 140 to move toward hopper 82. A chain driven sprocket 144 is keyed to shaft 126 and a drive chain 145 is trained about sprockets 94, 144.

This mechanism continuously conveys non-adherent powder that falls onto runs 122, 142 into hopper 82 for reclamation. To reduce the likelihood that any non-adherent powder will stick to belts 120, 140 and not fall into hopper 82, stationary doctor blades 146, 148 are mounted adjacent the sidewalls 84, 86 of hopper 82. Blades 146, 148 are inclined at substantially the angles of sidewalls 84, 86, respectively. The upper reaches of blades 146, 148 are spaced about one sixty-fourth inch (0.4 mm) from the surfaces of their respective belts 120, 140 to scrape from them reclaimable powder which then falls into hopper 82 to be reclaimed. Keeping the blade edges out of contact with the belts reduces the likelihood that particles of the belts or blades will contaminate the powder.

The powder is quite penetrating, particularly when sprayed in a pressurized air cloud. A downwardly and inwardly depending flexible rubber skirt 150 is mounted from the side- and end walls of floor portion 64. The lower reaches of skirt 150 all the way around its perimetral extent are only slight out of contact with the top runs 122, 142 of belts 120, 140 except in the hopper 82 region where there is no belt. This helps reduce the likelihood of large accumulations of powder in the regions under the top runs 122, 142 of belts 120, 140 on floor 66.

It is necessary from time to time for a workman to enter booth 62, for example, to remove powder from surfaces other than runs 122, 142 of belts 120, 140 preparatory to a color change. This is facilitated by idler rolls 156 spaced along the lengths of runs 122, 142 of belts 120, 140, respectively. Illustratively, idler rolls 156 are journalled in walls 68, 70 for rotation although they may be journalled for rotation in a separate frame supported within floor portion 64. It has been found that one and seven-eighths inch (4.8 cm) diameter rolls spaced three inches (7.6 cm) apart on centers beneath three-eighths inch (1 cm) thick belts 120, 140 provide adequate support for a workman to walk inside the booth 62 to clean it.

What is claimed is:

1. An apparatus for recovering a grannular material which is dispensed onto articles to be coated by the grannular material in an enclosure but not all of which grannular material adheres to the articles, the enclosure having an upstream end into which articles to be coated enter the enclosure and a downstream end from which grannular material-coated articles exit the enclosure, the apparatus including a first continuous belt of a material which is essentially impermeable to the grannular material, a first pair of rolls about which the first belt is trained, the first rolls extending generally horizontally and generally parallel to each other, the first belt trained about the first rolls having a vertically upper, generally horizontal run and a vertically lower, generally horizontal run, means for rotatably mounting the first rolls so that the vertically upper, generally horizontal run of the first belt is exposed to the interior of the enclosure, at least some of the non-adherent material being deposited onto the upper run of the first belt, means defining adjacent and vertically below one of the first rolls a hopper for recovering the non-adherent material deposited on the upper run of the first belt, a prime mover, means for coupling the prime mover to at least one of the first rolls, operation of the prime mover causing the vertically upper, generally horizontal run of the first belt to convey non-adherent grannular material to the hopper, the means for rotatably mounting the first rolls comprising means for rotatably mounting one of the first rolls adjacent the upstream end of the enclosure and means for rotatably mounting the other of the first rolls intermediate the upstream and downstream ends of the enclosure and adjacent the hopper, a first blade, means for mounting the first blade to project into closely spaced orientation to the first belt adjacent the hopper to remove from the first belt any grannular material which tends to adhere to the first belt and to deposit such grannular material into the hopper, a second continuous belt of a material which is essentially impermeable to the grannular material, a second pair of rolls about which the second belt is trained, the rolls of the second pair extending generally horizontally and generally parallel to each other, the second belt trained about the rolls of the second pair and having a vertically upper, generally horizontal run and a vertically lower, generally horizontal run, means for rotatably mounting the rolls of the second pair so that the vertically upper, generally horizontal run of the second belt is exposed to the interior of the enclosure, some of the non-adherent material being deposited onto the upper run of the second belt, the means for rotatably mounting the rolls of the second pair comprising means for rotatably mounting one of the second rolls adjacent the downstream end of the enclosure and means for rotatably mounting the other of the second rolls intermediate the upstream and downstream ends of the enclosure and adjacent the hopper, means for coupling at least one of the rolls of the second pair of rolls to the prime mover, operation of the prime mover causing the vertically upper run of the second belt to convey non-adherent grannular material to the hopper, a second blade, and means for mounting the second blade to project into closely spaced orientation to the second belt adjacent the hopper to remove from the second belt any grannular material which tends to adhere to the second belt and to deposit such grannular material into the hopper.

2. The apparatus of claim 1 and further comprising a conveyor for conveying articles to be coated through the enclosure, articles to be coated entering the enclosure at its upstream end on the conveyor and grannular material-coated articles exiting the enclosure at its downstream end on the conveyor.

* * * * *